US011379961B2

(12) United States Patent
Okano

(10) Patent No.: US 11,379,961 B2
(45) Date of Patent: Jul. 5, 2022

(54) INFORMATION PROCESSING APPARATUS, INFORMATION PROCESSING METHOD, AND PROGRAM

(71) Applicant: Sony Corporation, Tokyo (JP)

(72) Inventor: Yuta Okano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 16/979,174

(22) PCT Filed: Nov. 22, 2018

(86) PCT No.: PCT/JP2018/043237
§ 371 (c)(1),
(2) Date: Sep. 9, 2020

(87) PCT Pub. No.: WO2019/176177
PCT Pub. Date: Sep. 19, 2019

(65) Prior Publication Data
US 2020/0402218 A1 Dec. 24, 2020

(30) Foreign Application Priority Data

Mar. 16, 2018 (JP) .............................. JP2018-049854

(51) Int. Cl.
*H04N 5/262* (2006.01)
*G06T 5/50* (2006.01)
*G06T 5/00* (2006.01)
*H04N 5/232* (2006.01)
*H04N 5/265* (2006.01)

(52) U.S. Cl.
CPC ................ *G06T 5/50* (2013.01); *G06T 5/002* (2013.01); *G06T 5/003* (2013.01);
(Continued)

(58) Field of Classification Search
CPC .......... H04N 5/23258; H04N 5/23267; H04N 5/23232; H04N 5/265; H04N 5/217;
(Continued)

(56) References Cited

U.S. PATENT DOCUMENTS

2008/0069551 A1 3/2008 Wakamatsu et al.
2017/0078577 A1* 3/2017 Wakamatsu ....... H04N 5/23267
(Continued)

FOREIGN PATENT DOCUMENTS

JP 2006-115346 * 4/2006 ............. H04N 5/232
JP 2006-115346 A 4/2006
(Continued)

OTHER PUBLICATIONS

International Search Report and Written Opinion dated Jan. 29, 2019 for PCT/JP2018/043237 filed on Nov. 22, 2018, 11 pages including English Translation of the International Search Report.

*Primary Examiner* — Kelly L Jerabek
(74) *Attorney, Agent, or Firm* — Xsensus LLP

(57) ABSTRACT

Provided is an information processing apparatus capable of further enhancing an effect of reducing blurring or noise in an image at the time of MFNR.
An information processing apparatus including a control unit that selects a reference image from a plurality of images continuously captured by an image capturing apparatus, on the basis of information of the image capturing apparatus acquired by an inertial sensor when each of the images is captured, and superimposes remaining images on the reference image while performing alignment with the reference image, to combine the images into one image.

20 Claims, 9 Drawing Sheets

(52) U.S. Cl.
CPC ..... *H04N 5/23258* (2013.01); *H04N 5/23267* (2013.01); *H04N 5/265* (2013.01); *G06T 2207/20201* (2013.01); *G06T 2207/20221* (2013.01)

(58) Field of Classification Search
CPC .......... H04N 5/357; G06T 5/50; G06T 5/002; G06T 5/003
See application file for complete search history.

(56) References Cited

U.S. PATENT DOCUMENTS

| | | | |
|---|---|---|---|
| 2017/0155842 A1* | 6/2017 | Takayanagi | ........ H04N 5/23267 |
| 2017/0347032 A1 | 11/2017 | Kajimura et al. | |
| 2019/0364188 A1 | 11/2019 | Sano et al. | |

FOREIGN PATENT DOCUMENTS

| | | | | |
|---|---|---|---|---|
| JP | 2008-078945 | A | 4/2008 | |
| JP | 2008-271246 | * | 11/2008 | ............. H04N 5/232 |
| JP | 2008-271246 | A | 11/2008 | |
| JP | 2008-271529 | A | 11/2008 | |
| JP | 2009-194896 | A | 8/2009 | |
| JP | 2012-14268 | * | 1/2012 | ............. H04N 5/225 |
| JP | 2012-014268 | A | 1/2012 | |
| JP | 2015-019327 | A | 1/2015 | |
| JP | 2017-126889 | * | 7/2017 | ............. H04N 5/232 |
| JP | 2017-126889 | A | 7/2017 | |
| JP | 2017-212681 | A | 11/2017 | |
| JP | 2018-011162 | A | 1/2018 | |

* cited by examiner

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2018/043237, filed Nov. 22, 2018, which claims priority to JP 2018-049854, filed Mar. 16, 2018, the entire contents of each are incorporated herein by reference.

TECHNICAL FIELD

The present disclosure relates to an information processing apparatus, an information processing method, and a program.

BACKGROUND ART

In general cameras, image quality of a captured image is determined by combination of a shutter speed, ISO sensitivity, and an aperture value. With cameras installed in smartphones, which are now widely used, it is possible to capture images with better image quality by appropriately setting the shutter speed and the ISO sensitivity. For example, when the shutter speed is set to be slow, an exposure time becomes longer, so that a brighter image is captured. However, camera shake occurs or a moving subject is blurred. In addition, also when the ISO sensitivity is set high, a brighter image is captured, while noise increases. Thus, a trade-off relation occurs in the setting of the shutter speed and the ISO sensitivity, that is, when high image quality is pursued in the setting, blurring occurs or noise increases.

In this connection, a technique of combining images, which is called multi frame noise reduction (MFNR) and can reduce noise by combining a plurality of images, is generally used. In the MFNR, a plurality of images continuously captured is superimposed to be combined into one image. Even in an image having high ISO sensitivity and much noise, the noise can be reduced by averaging by using a plurality of images. Note that Patent Document 1 below discloses a technique capable of extending an exposure time in an image capturing apparatus that combines a plurality of images.

CITATION LIST

Patent Document

Patent Document 1: JP 2018-011162 A

SUMMARY OF THE INVENTION

Problems to be Solved by the Invention

In existing MFNR, on a first image of a plurality of images continuously captured, subsequent images are sequentially superimposed. However, in such a simple way of superimposition, there is a problem that, in a case where the first image is an image with blurring, blurring remains in a final image obtained by performing the superimposition processing.

Therefore, the present disclosure proposes a new and improved information processing apparatus, information processing method, and program that are capable of further enhancing an effect of reducing blurring or noise in an image at the time of MFNR.

Solutions to Problems

According to the present disclosure, there is provided an information processing apparatus including a control unit that selects a reference image from a plurality of images continuously captured by an image capturing apparatus, on the basis of information of the image capturing apparatus acquired by an inertial sensor when each of the images is captured, and superimposes remaining images on the reference image while performing alignment with the reference image, to combine the images into one image.

In addition, according to the present disclosure, there is provided an information processing method executed by a processor, the method including selecting a reference image from a plurality of images continuously captured by an image capturing apparatus, on the basis of information of the image capturing apparatus acquired by an inertial sensor when each of the images is captured, and superimposing remaining images on the reference image while performing alignment with the reference image, to combine the images into one image.

In addition, according to the present disclosure, there is provided a program for causing a computer to function as a control unit that selects a reference image from a plurality of images continuously captured by an image capturing apparatus, on the basis of information of the image capturing apparatus acquired by an inertial sensor when each of the images is captured, and superimposes remaining images on the reference image while performing alignment with the reference image, to combine the images into one image.

Effects of the Invention

As described above, according to the present disclosure, it is possible to further enhance an effect of reducing blurring or noise in an image at the time of MFNR.

Note that the above-described effect is not necessarily limiting, and in conjunction with or in place of the above effect, any of the effects shown in the present specification, or other effects that may be understood from the present specification, may be achieved.

MODE FOR CARRYING OUT THE INVENTION

Hereinafter, preferred embodiments of the present disclosure will be described in detail with reference to the accompanying drawings. Note that, in the present specification and drawings, components having substantially the same functional configuration are denoted by the same reference signs, and redundant description thereof is omitted.

Note that the description will be made in the following order.
1. Overview of Present Disclosure
2. Embodiment of Present Disclosure
2.1. Configuration Example
2.2. Operation Example
2.3. Experimental Results
3. Modifications
4. Hardware Configuration
5. Conclusion

1. Overview of Present Disclosure

1.1. Overview of Information Processing Apparatus

Figure 1:
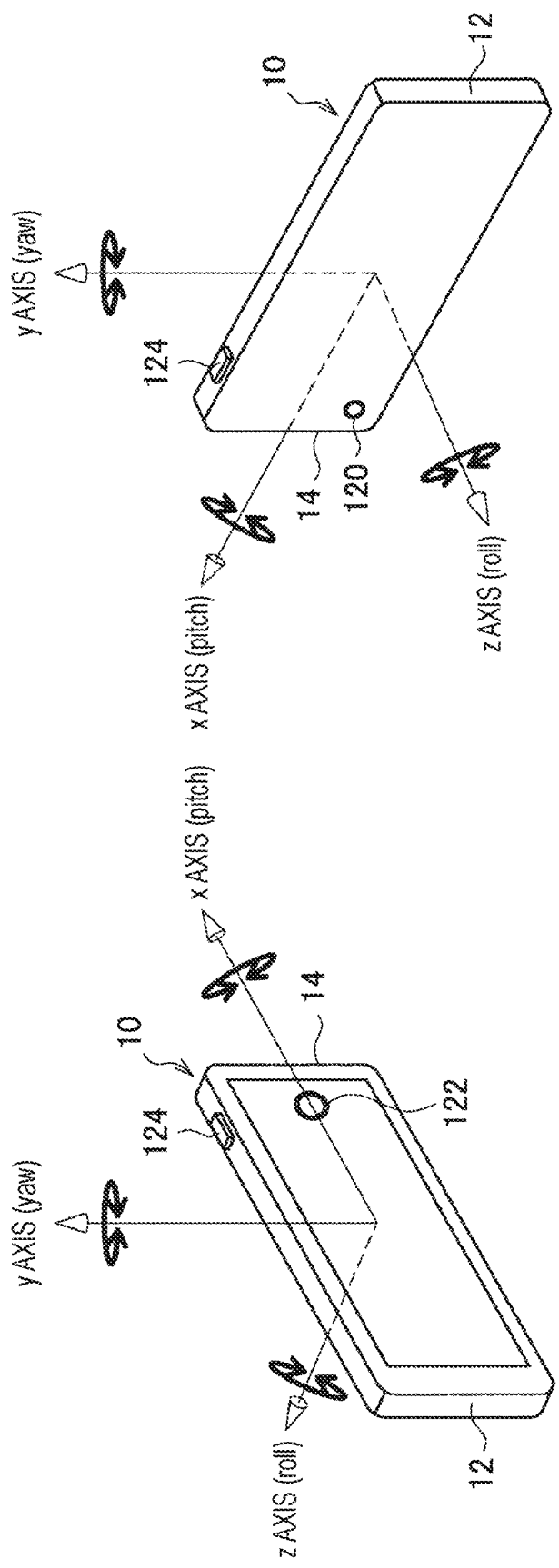
FIG. 1 is an explanatory diagram illustrating definitions of rotation axes of a mobile terminal according to an embodiment of the present disclosure.

Hereinafter, an overview of an embodiment of the present disclosure will be described with reference to FIG. 1. FIG. 1 is an explanatory diagram illustrating definitions of rotation axes of a mobile terminal according to the embodiment of the present disclosure. A mobile terminal 10 is an information processing apparatus such as a smartphone, a tablet terminal, or a digital camera. Hereinafter, an example in which a smartphone is used as the mobile terminal 10 will be described.

Hereinafter, a state in which a long side of the mobile terminal 10 is horizontal to the ground and a short side thereof is vertical to the ground is referred to as a state in which the mobile terminal 10 is held laterally. In addition, a state in which a long side of the mobile terminal 10 is vertical to the ground and a short side thereof is horizontal to the ground is referred to as a state in which the mobile terminal 10 is held longitudinally.

There is a plurality of methods for a user to capture an image with the mobile terminal 10. For example, a user supports a left side 12 of the mobile terminal 10 laterally with a left hand, and presses a software switch 122 with a right hand, to capture an image. In addition, the user may support a lower side (right side 14 when the mobile terminal 10 is held laterally) of the mobile terminal 10 longitudinally with a left hand, and presses the software switch 122 with the left hand, to capture an image. In addition, the user may support the left side 12 of the mobile terminal 10 laterally with a left hand, support the right side 14 of the mobile terminal laterally with a right hand, and press a hardware switch 124 with the right hand, to capture an image. Note that, in the present specification, unless specifically noted, it is assumed that the user supports the left side 12 of the mobile terminal 10 laterally with a left hand, and presses the software switch 122 with a right hand, to capture an image.

The mobile terminal 10 includes an image capturing unit 130 as an image capturing apparatus. In the mobile terminal 10, an axis in an image capturing direction of the image capturing unit 130 is set as a roll axis (z axis). In addition, in the mobile terminal 10, as illustrated in FIG. 1, an axis in a long side direction of the mobile terminal 10 is set as a pitch axis (x axis) and an axis in a short side direction of the mobile terminal 10 is set as a yaw axis (y axis). Note that the pitch axis and the yaw axis are not limited to such examples, and may be set optionally. The three axes, that is, the x axis, the y axis, and the z axis, are orthogonal to one another. In addition, as long as the three axes are orthogonal to one another, the x axis and the y axis may not be horizontal to the long side direction and the short side direction of the mobile terminal 10, respectively.

When the user presses the software switch 122, a force is applied to the mobile terminal 10, and the force may cause the mobile terminal 10 to rotate about at least one of the x axis, the y axis, or the z axis. In addition, when the user presses the software switch 122, a hand of the user supporting the mobile terminal 10 may move while an image is being captured by the image capturing unit 130, so that the position of the mobile terminal 10 may be shifted from the position at the time of starting image capturing. Such rotation and shift cause blurring in a captured image.

Although blurring in the image is reduced by increasing a shutter speed at the time of image capturing, an exposure time is shortened accordingly. As a result, the image may be darker. In addition, brightness of the image can be adjusted by setting of ISO sensitivity. However, when the ISO sensitivity is increased to brighten the image, noise may occur in the image.

Principle of MFNR

To address this, there is a technique called multi frame noise reduction (MFNR) that can reduce noise by superimposing a plurality of images continuously captured. In the MFNR, processing of combining the plurality of images into one image by superimposing images while performing alignment with a reference image (hereinafter, also referred to as MFNR processing) is performed. Here, the term "alignment" means that the position of a first pixel in the reference image is aligned with the position of a second pixel corresponding to the first pixel in an image to be superimposed, so that the positions match each other. In the MFNR processing, even in an image having high ISO sensitivity and much noise, the noise can be reduced by averaging by using a plurality of images.

For example, one image captured without using the MFNR is compared with one image obtained by combination of images by using the MFNR. Under an image capturing condition in which blurring amounts in both images are similar (for example, the same shutter speed), an exposure time at the time of capturing each image used for the MFNR is the same as an exposure time at the time of capturing an image in a case where the MFNR is not used. However, in the case where the MFNR is used, brightness of each of a plurality of images is added. As a result, even when ISO sensitivity is set to be lower than that in the case where the MFNR is not used, it is possible to capture an image with brightness similar to or greater than that in the case where the MFNR is not used. Thus, in the case where the MFNR is used, ISO sensitivity can be set low, and noise can be reduced.

In addition, under an image capturing condition in which noise amounts in both images are similar (for example, the same ISO sensitivity), an exposure time at the time of capturing each image used for the MFNR in the case where the MFNR is used is set to be shorter than that in the case where the MFNR is not used. As a result, even when the noise amounts in both images are similar, a blurring amount becomes smaller in the image obtained by combination of images using the MFNR. Thus, in the case where the MFNR is used, an image with a small blurring amount can be captured as compared with the case where the MFNR is not used.

In addition, in the MFNR, on a reference image selected in advance from a plurality of images continuously captured, remaining images other than the reference image are superimposed by the MFNR in the image capturing order of the remaining images. Regarding the reference image, a first image of the plurality of images continuously captured is generally selected as a reference image.

Improvement in MFNR

However, timing of starting exposure for capturing the first image is close to timing when a user presses a shutter. Thus, there is a high possibility that blurring occurs in the first image as compared with other images. By using an image in which blurring occurs as a reference image, there is a high possibility that blurring occurs also in an image obtained by performing the MFNR processing.

To address this, in the embodiment of the present disclosure, a technique is proposed which further reduces blurring or noise in an image by selecting an image with less blurring as a reference image from a plurality of images continuously captured, sorting remaining images in the order of less blurring, and performing the MFNR processing on the reference image.

For example, the MFNR processing in a case where a first image is used as a reference image and the MFNR processing according to the proposed technique (that is, the MFNR processing in a case where an image with less blurring is used as a reference image) will be compared. Under an image capturing condition in which blurring amounts in images used in both types of processing are similar (for example, the same shutter speed), exposure times at the time of capturing images used in both types of processing are the same. Even when the exposure times are the same, a blurring amount in each of the plurality of images is not always the same. For example, due to a relation between shutter pressing timing and exposure timing, an image having a blurring amount smaller than that in a first image exists in second and subsequent images. As an example, it is assumed that a blurring amount in a first image is the largest. At this time, in the case of the MFNR processing using the first image as a reference image, the image having the largest blurring amount is used as a base and other images are superimposed on the image. Thus, a blurring amount of an image obtained by performing the MFNR processing remains large. On the other hand, in the case of the MFNR processing using the proposed technique, an image having a small blurring amount is used as a base and other images are superimposed on the image. Thus, a blurring amount of an image obtained by performing the MFNR processing is small as compared with the case of the MFNR processing using the first image as a reference image. Furthermore, in the MFNR according to the proposed technique, since other images are superimposed in ascending order of the blurring amounts, an effect of the superimposition can be further enhanced.

Examples of a method of making a blurring amount in the MFNR processing using the first image as a reference image similar to a blurring amount in the MFNR processing according to the proposed technique include shortening an exposure time. However, by shortening the exposure time, brightness of an image to be captured becomes dark. Thus, in order to keep the brightness of the image while further reducing blurring in the image, it is conceivable to increase ISO sensitivity. However, by increasing the ISO sensitivity, noise in the image to be captured increases. That is, in the case of the MFNR processing according to the proposed technique, since the ISO sensitivity can be set low as compared with the case of the MFNR processing using the first image as a reference image, reduction of noise in an image obtained by performing the MFNR processing is expected.

Note that, in the above-described principle of the MFNR, an example of using the method in which a plurality of images is added and superimposed at the time of the MFNR has been described as a general example. However, in the embodiment of the present disclosure, the method in which a plurality of images is averaged and superimposed at the time of the MFNR is used. This is because, in the MFNR using the method in which a plurality of images is averaged and superimposed, noise can be reduced without changing brightness of an image (setting of ISO sensitivity). Specifically, a case will be described as an example, in which MFNR processing using four images is performed in an environment where appropriate exposure is obtained at ISO sensitivity of 800 and a shutter speed of $\frac{1}{30}$ s when one image is captured. In a case where the above-described general method is used, since the four images are added, an image with appropriate exposure can be acquired by setting the ISO sensitivity when one image is captured to 200 and adding the images. Note that, when the shutter speed is $\frac{1}{30}$ s, the total image capturing time is $\frac{4}{30}$ s. However, the general method is susceptible to quantization noise, and noise tends to remain. On the other hand, in a case where the method in the embodiment of the present disclosure is used, since four images are averaged, an image with appropriate exposure can be acquired without changing ISO sensitivity. Note that, when the shutter speed is $\frac{1}{30}$ s, the total image capturing time is $\frac{4}{30}$ s. In the method in the embodiment of the present disclosure, noise is also averaged by averaging a plurality of images. Thus, noise in an image obtained by performing the MFNR processing can be reduced.

In this way, in the MFNR processing according to the proposed technique, blurring or noise in an image obtained by performing the MFNR processing can further be reduced than in the MFNR processing using the first image as a reference image.

In order to achieve the above-described technique, the mobile terminal 10 according to the present embodiment acquires continuously captured images and information regarding movement of the position of the image capturing unit 130 acquired by an inertial sensor at the time of capturing the images. On the basis of the acquired image and the information regarding movement of the position of the image capturing unit 130, the mobile terminal 10 selects, from the plurality of images, a reference image that serves as a reference when the images are superimposed, and superimposes remaining images on the reference image while performing alignment with the reference image, to combine the images into one image.

The overview of the present disclosure has been described above with reference to FIG. 1. Subsequently, the embodiment of the present disclosure will be described.

2. Embodiment of Present Disclosure

2.1. Configuration Example

Figure 2:
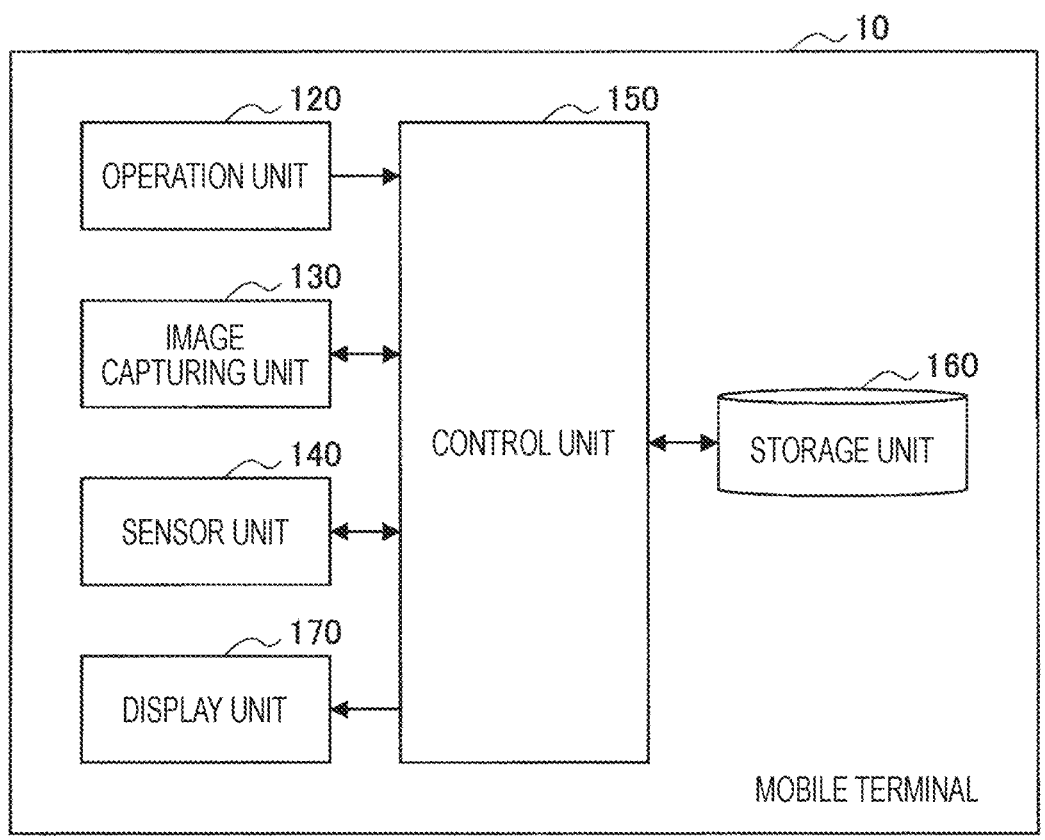
FIG. 2 is a block diagram illustrating a configuration example of the mobile terminal according to the embodiment.

Hereinafter, a configuration example of the mobile terminal 10 according to the embodiment of the present disclosure will be described with reference to FIGS. 2 to 5. FIG. 2 is a block diagram illustrating a configuration example of an information processing apparatus according to the embodiment of the present disclosure. As illustrated in FIG. 2, the mobile terminal 10 includes an operation unit 120, the image capturing unit 130, a sensor unit 140, a control unit 150, a storage unit 160, and a display unit 170.

(1) Operation Unit 120

The operation unit 120 has a function for a user to input an image capturing instruction. For example, as illustrated in FIG. 1, the operation unit 120 is implemented by the software switch 122 displayed on a screen by a camera application. In addition, the operation unit 120 may be implemented by the hardware switch included in the mobile terminal 10.

(2) Image Capturing Unit 130

The image capturing unit 130 has a function for capturing an image. The image capturing unit 130 is a camera, for example, and performs image capturing on the basis of an image capturing instruction from a user. Specifically, the image capturing unit 130 performs image capturing by receiving the image capturing instruction input by the user via the control unit 150. At this time, the image capturing unit 130 continuously captures a plurality of images in response to one image capturing instruction from the user. Then, the image capturing unit 130 outputs the captured images to the control unit 150. Note that the number of images to be captured by the image capturing unit 130 is not limited, and the optional number of images may be captured.

Note that, in the embodiment of the present disclosure, the number and types of cameras to be used as the image capturing unit 130 are not particularly limited, and the optional number of cameras and optional types of cameras may be used. For example, the mobile terminal 10 may include an inner camera on a display side (a side of the display unit 170) in addition to the outer camera (image capturing unit 130) illustrated in FIG. 1.

(3) Sensor Unit 140

The sensor unit 140 has a function of measuring information regarding movement of the mobile terminal 10. The sensor unit 140 includes an inertial sensor as a sensor, for example, and measures, using the inertial sensor, information for calculating an index indicating magnitude of camera shake at the time of capturing an image.

The sensor unit 140 may include a gyro sensor as the inertial sensor. The gyro sensor is an inertial sensor having a function of acquiring an angular velocity of an object. The gyro sensor is a sensor for determining an amount of change in an angle when an object rotates in a certain time. The types of gyro sensors include a mechanical sensor that obtains an angular velocity from inertial force applied to a rotating object, or a fluid sensor that obtains an angular velocity from a change in a flow of gas in a flow path. However, the type of the gyro sensor is not particularly limited, and a micro electro mechanical system (MEMS) technology may be applied.

In the embodiment of the present disclosure, the above-described gyro sensor measures an amount of change in a posture of the mobile terminal 10 that changes when a user inputs an image capturing instruction, and outputs a measured value to the control unit 150. The amount of change in the posture is an angular velocity (°/sec) generated by rotation about the x axis as a rotation axis, rotation about the y axis as a rotation axis, and rotation about the z axis as a rotation axis. A sampling frequency of the angular velocity in the present embodiment is 200 Hz (5 ms). Note that a value of the sampling frequency is not particularly limited, and an optional value may be set.

In addition, the gyro sensor also measures an amount of change in the posture of the mobile terminal 10 that changes while images are being captured by the image capturing unit 130 on the basis of the image capturing instruction, and outputs a measured value to the control unit 150.

In addition, the sensor unit 140 may include an acceleration sensor as the inertial sensor. The acceleration sensor is an inertial sensor having a function of acquiring acceleration of an object. The acceleration sensor is a device for determining an amount of change in a velocity of movement of an object in a certain time. The types of acceleration sensors include a sensor that obtains acceleration from a change in a position of a weight connected to a spring, or a sensor that obtains acceleration from a change in a frequency when vibration is applied to a spring with a weight. However, the type of the acceleration sensor is not particularly limited, and a MEMS technology may be applied.

(4) Control Unit 150

The control unit 150 has a function for controlling operation of the mobile terminal 10. For example, the control unit 150 controls image capturing performed by the image capturing unit 130 on the basis of an image capturing instruction from a user. Specifically, the control unit 150 receives, from the operation unit 120, the image capturing instruction input by the user to the operation unit 120, and instructs, on the basis of the image capturing instruction, the image capturing unit 130 to perform image capturing.

In addition, the control unit 150 has a function of performing processing of superimposing a plurality of images (MFNR processing). For example, the control unit 150 superimposes, on the basis of information acquired by the inertial sensor, a plurality of images captured by the image capturing unit 130. Specifically, the control unit 150 acquires continuously captured images and information regarding movement of the position of the image capturing unit 130 acquired by the inertial sensor at the time of capturing the images. On the basis of the acquired images and the information regarding movement of the position of the image capturing unit 130, the control unit 150 selects, from the plurality of images, a reference image that serves as a reference when the images are superimposed. Then, the control unit 150 superimposes remaining images on the reference image while performing alignment with the reference image, to combine the images into one image. Thus, the control unit 150 generates an image in which blurring or noise is reduced.

To select the reference image, the control unit 150 calculates an index indicating magnitude of blurring in each of the plurality of images. For example, the control unit 150 calculates an index indicating magnitude of blurring in each image on the basis of an angular velocity measured by the gyro sensor when each of the plurality of images is captured, and selects an image with the smallest index as the reference image. Note that the index indicating magnitude of blurring is represented by an angle calculated by integrating the angular velocity measured by the gyro sensor within an exposure time at the time of image capturing.

Hereinafter, a method of calculating the index indicating magnitude of blurring from the angular velocity measured by the gyro sensor will be specifically described with reference to FIGS. 3 to 5.

First, a formula for calculating the index indicating magnitude of blurring will be described with reference to FIGS. 3 and 4. FIG. 3 is an explanatory diagram illustrating loci of blurring according to the present embodiment. FIG. 4 is an explanatory diagram illustrating distances and rotation angles from fulcrums to specific pixels according to the present embodiment.

A way in which an image is blurred changes in accordance with the rotation axis of the mobile terminal 10, a fulcrum at the time of rotation, and a distance from the fulcrum to a pixel. For example, as illustrated in a diagram on the left side of FIG. 3, when the mobile terminal 10 rotates about a z axis as a rotation axis and a lower left corner of the mobile terminal 10 as a fulcrum, the larger a distance from the fulcrum to a pixel (for example, a pixel 20), the larger a locus of blurring (for example, a locus 22).

Figure 3:
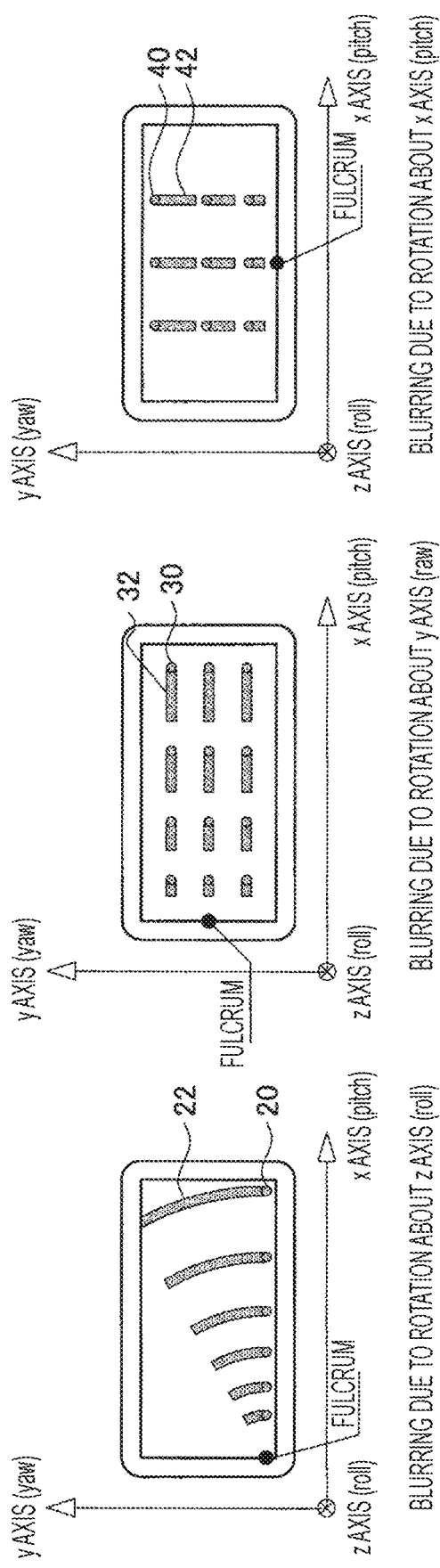
FIG. 3 is an explanatory diagram illustrating loci of blurring of pixels according to the embodiment.

In addition, as illustrated in a diagram in the center of FIG. 3, when the mobile terminal 10 rotates about a y axis as a rotation axis and the left center of the mobile terminal 10 as a fulcrum, the larger a distance from the fulcrum to a pixel (for example, a pixel 30), the larger a locus of blurring in the z-axis direction at the start of rotation. Note that, in the case of a subject at a point at infinity, a locus of blurring is a locus in the x-axis direction (for example, a locus 32).

In addition, as illustrated in a diagram on the right side of FIG. 3, when the mobile terminal 10 rotates about an x axis as a rotation axis and the lower center of the mobile terminal 10 as a fulcrum, the larger a distance from the fulcrum to a pixel (for example, a pixel 40), the larger a locus of blurring in the z-axis direction at the start of rotation. Note that, in the case of a subject at a point at infinity, as illustrated in FIG. 3, a locus of blurring is a locus in the y-axis direction (for example, a locus 42).

As described above, to more accurately calculate an index of magnitude of blurring by the control unit 150 in a case where there are some patterns in a way in which an image is blurred, the control unit 150 desirably calculates the number of pixels to which a blurring amount in a certain pixel corresponds on the basis of a distance from a fulcrum to each pixel, an angular velocity, and a pixel pitch. Furthermore, the control unit 150 preferably calculates blurring amounts corresponding to the number of blurred pixels, to calculate an index of overall magnitude of blurring. For example, as illustrated on the left side of FIG. 4, when the mobile terminal 10 rotates about a z axis as a rotation axis and a position of an intersection of an x axis and a y axis as a fulcrum, an initial coordinate P of the image capturing unit 130 is ($x_0$, $y_0$, $z_0$), and a rotated angle is $\theta_z$. At this time, a blurring amount is calculated using the number of pixels, where a blurring amount in the x-axis direction is calculated as ($x_0 \cos \theta_z - y_0 \sin \theta_z$)/pixel pitch pixels and a blurring amount in the y-axis direction is calculated as ($x_0 \sin \theta_z + y_0 \cos \theta_z$)/pixcel pitch pixels.

Figure 4:
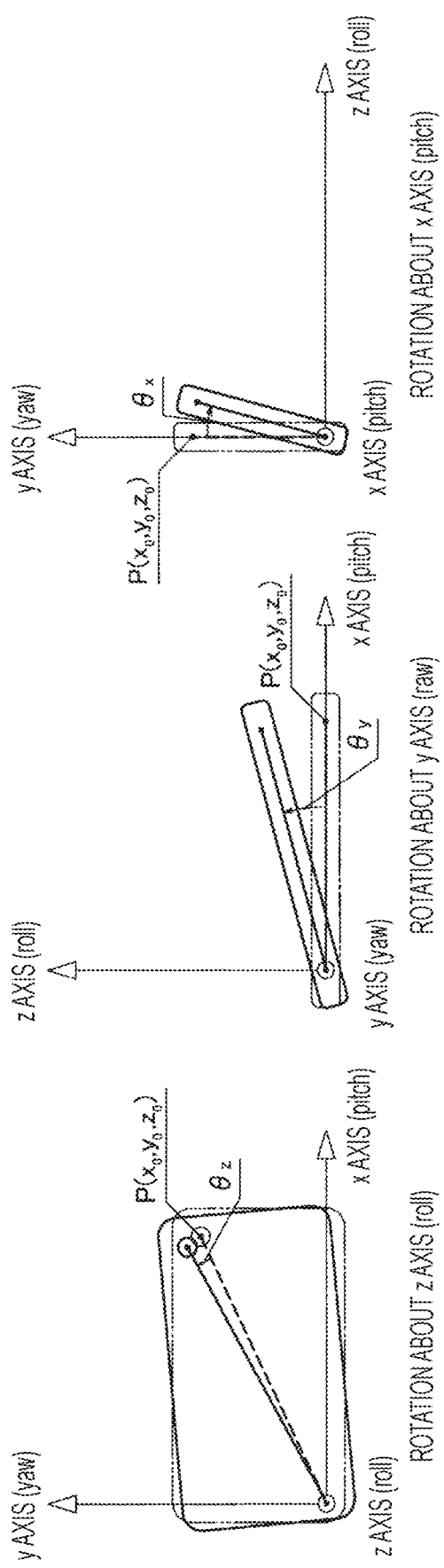
FIG. 4 is an explanatory diagram illustrating distances and rotation angles from fulcrums to specific pixels according to the embodiment.

In addition, as illustrated in the center of FIG. 4, when the mobile terminal 10 rotates about the y axis as a rotation axis and a position of an intersection of the x axis and the z axis as a fulcrum, an initial coordinate P of the image capturing unit 130 is ($x_0$, $y_0$, $z_0$), and a rotated angle is $\theta_y$. At this time, a blurring amount is calculated using the number of pixels, where a blurring amount in the x-axis direction is calculated as ($x_0 \cos \theta_y - z_0 \sin \theta_y$)/pixcel pitch pixels.

In addition, as illustrated on the right side of FIG. 4, when the mobile terminal 10 rotates about the x axis as a rotation axis and a position of an intersection of the y axis and the z axis as a fulcrum, an initial coordinate P of the image capturing unit 130 is ($x_0$, $y_0$, $z_0$), and a rotated angle is $\theta_x$. At this time, a blurring amount is calculated using the number of pixels, where a blurring amount in the y-axis direction is calculated as ($y_0 \cos \theta_x - z_0 \sin \theta_x$)/pixcel pitch pixels.

To accurately calculate an index of magnitude of blurring, it is ideal to perform calculation as described above. In the above-described method, calculation is performed as many times as the number of blurred pixels. Thus, depending on magnitude of blurring, the number of calculation objects increases, and the calculation processing may take time. Therefore, in the embodiment of the present disclosure, to reduce a calculation amount, a method of simply calculating, on the basis of information regarding the mobile terminal 10 measured by the inertial sensor, an index indicating magnitude of blurring is used.

When simply calculating the index, the control unit 150 sets an axis in an image capturing direction of the image capturing unit 130 as a roll axis, and uses at least one of angular velocities relative to a pitch axis or a yaw axis orthogonal to the roll axis. At this time, the control unit 150 selects, in accordance with a type of an image capturing instruction input by a user, which angular velocity to use among the angular velocities relative to the roll axis, the pitch axis, and the yaw axis.

For example, in a case where the control unit 150 receives an image capturing instruction of a type in which the image capturing unit 130 rotates about the yaw axis or the pitch axis as a rotation axis, the control unit 150 calculates the index using, among the angular velocities, at least the angular velocities relative to the pitch axis and the yaw axis. Specifically, in a case where a user presses the software switch 122 to input the image capturing instruction as in the embodiment of the present disclosure, it is assumed that rotational components about the pitch axis (x axis) and the yaw axis (y axis) are dominant, and a rotational component about the roll axis (z axis) is small.

Thus, the control unit 150 calculates the index by the following Mathematical Formula (1), in which calculation regarding the rotational component about the roll axis (z axis) is omitted. By omitting the calculation regarding the rotational component about the roll axis (z axis), the control unit 150 can reduce a calculation amount, and moreover, an effect of more appropriately selecting a reference image is expected.

[Mathematical Formula 1]

$$(\max.\theta_x - \min.\theta_x)^2 + (\max.\theta_y - \min.\theta_y)^2 \qquad (1)$$

Note that, in Mathematical Formula (1), $\max.\theta_x$ is the maximum value of an angle calculated from a plurality of angular velocities in the x axis acquired during an exposure time for one image for which the index is to be calculated. $\min.\theta_y$ is the minimum value of the angle calculated from the plurality of angular velocities in the x axis acquired during the exposure time for one image for which the index is to be calculated. In addition, $\max.\theta_y$ is the maximum value of an angle calculated from a plurality of angular velocities in the y axis acquired during the exposure time for one image for which the index is to be calculated. $\min.\theta_y$ is the minimum value of the angle calculated from the plurality of angular velocities in the y axis acquired during the exposure time for one image for which the index is to be calculated.

In addition, in a case where the control unit 150 receives an image capturing instruction of a type in which the image capturing unit 130 rotates about the roll axis as a rotation axis, the control unit 150 calculates the index using, among the angular velocities, at least the angular velocity relative to the roll axis. Specifically, in a case where a user presses the hardware switch 124 illustrated in FIG. 1 to input an image capturing instruction, it is assumed that a rotational component about the roll axis (z axis) is dominant, and rotational components about the pitch axis (x axis) and the yaw axis (y axis) are small.

Thus, the control unit 150 calculates the index by the following Mathematical Formula (2), in which calculation regarding the rotational components about the pitch axis (x axis) and the yaw axis (y axis) is omitted. By omitting the calculation regarding the rotational components about the pitch axis (x axis) and the yaw axis (y axis), the control unit 150 can reduce a calculation amount, and moreover, an effect of more appropriately selecting a reference image is expected. Note that the following Mathematical Formula (2) is used on the assumption that the hardware switch 124 is provided on an upper side of a long side of the mobile terminal 10 and at a position diagonal to a fulcrum.

[Mathematical Formula 2]

$$(\max.\theta_z - \min.\theta_x)^2 \quad (2)$$

Note that, in Mathematical Formula (2), $\max.\theta_z$ is the maximum value of an angle calculated from a plurality of angular velocities in the z axis acquired during an exposure time for one image for which the index is to be calculated. $\min.\theta_z$ is the minimum value of the angle calculated from the plurality of angular velocities in the z axis acquired during the exposure time for one image for which the index is to be calculated.

Subsequently, a method of calculating an index indicating magnitude deviation using the above-described calculation formulas will be described with reference to FIG. 5. FIG. 5 is an explanatory diagram illustrating an angular velocity and a rotation angle at the time of capturing images according to the present embodiment.

Figure 5:
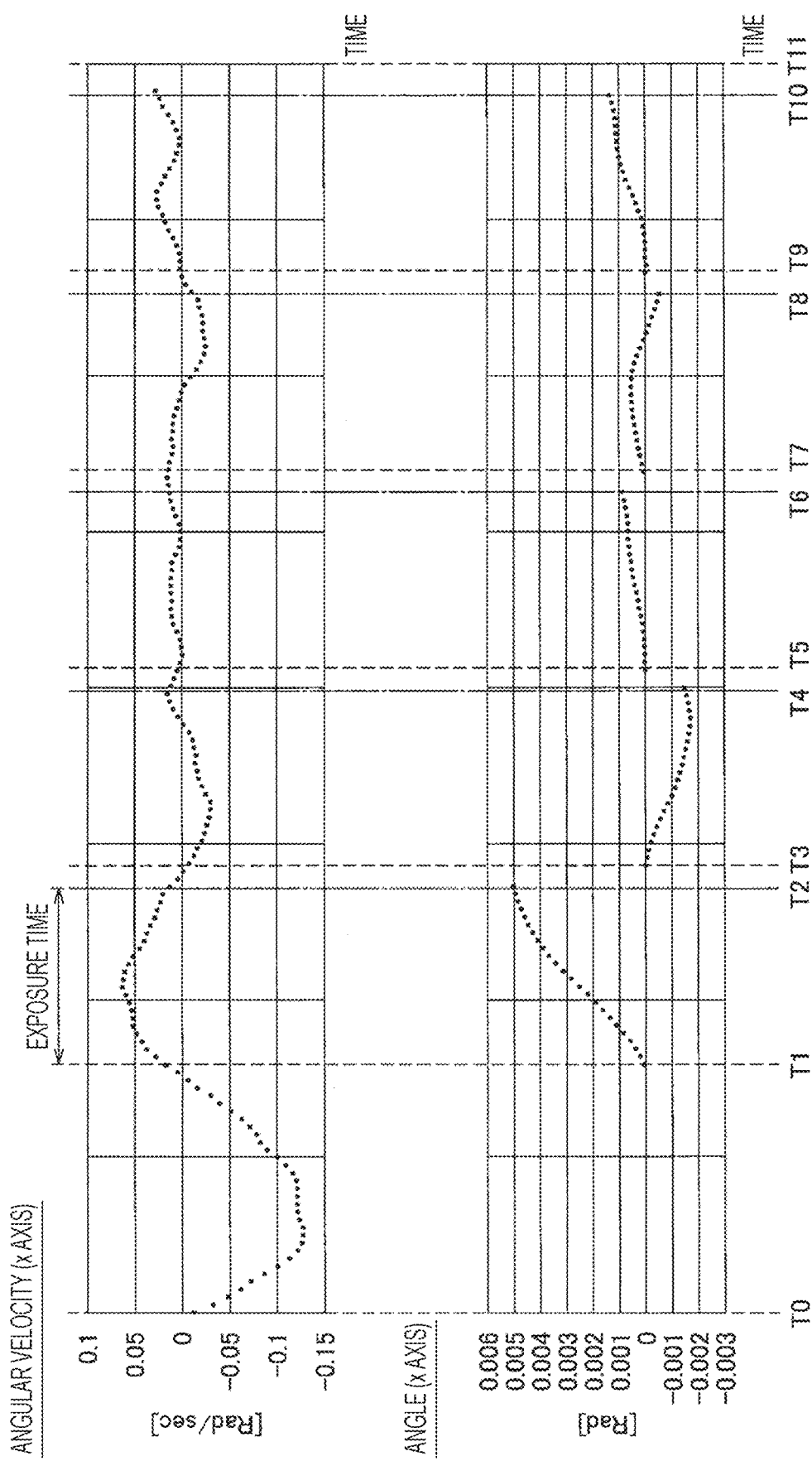
FIG. 5 is an explanatory diagram illustrating an angular velocity and a rotation angle at the time of capturing images according to the embodiment.

An upper graph of FIG. 5 indicates changes over time in an angular velocity measured by the gyro sensor. In addition, the vertical axis of the upper graph indicates an angular velocity in the x axis, and the horizontal axis indicates a time. Note that information indicated in the upper graph indicates changes over time in the angular velocity in the x axis measured when the image capturing unit 130 continuously captures five images after a user inputs an image capturing instruction at a time $T_0$. In addition, the angular velocity indicated in the graph is acquired at 5 ms intervals. Note that, for simplification of description, illustration of a graph indicating an angular velocity in the y axis is omitted.

Times from $T_1$ to $T_2$, $T_3$ to $T_4$, $T_5$ to $T_6$, $T_7$ to $T_5$, and $T_9$ to $T_{10}$ in the upper graph respectively indicate exposure times for a first captured image, a second captured image, a third captured image, a fourth captured image, and a fifth captured image. The angular velocity is acquired a plurality of times by the gyro sensor during one exposure time when each of the plurality of images is captured. In addition, an index indicating magnitude of blurring in each image is calculated on the basis of an angular velocity of the image capturing unit 130 acquired within an exposure time for each image.

In addition, times from $T_2$ to $T_3$, $T_4$ to $T_5$, $T_6$ to $T_7$, $T_8$ to $T_9$, and $T_{10}$ to $T_{11}$ in the upper graph respectively indicate readout times for the first captured image, the second captured image, the third captured image, the fourth captured image, and the fifth captured image.

In addition, a lower graph of FIG. 5 indicates changes in an angle from the beginning to the end of each exposure time, where an angle at the beginning of each exposure time is set to 0. The vertical axis of the lower graph indicates a rotation angle about the x axis at a time T, and the horizontal axis indicates a time.

Times from $T_1$ to $T_2$, $T_3$ to $T_4$, $T_5$ to $T_6$, $T_7$ to $T_8$, and $T_9$ to $T_{10}$ in the lower graph respectively indicate, similarly to those in the upper graph, the exposure times for the first captured image, the second captured image, the third captured image, the fourth captured image, and the fifth captured image.

By integrating the angular velocity by the time T, an angle at the time T is calculated. For example, when the angular velocity indicated in the upper graph is integrated by the time T, the angle at the time T is calculated as indicated in the lower graph. The angle in the lower graph indicates an angle at which the mobile terminal 10 has rotated about the x axis at the time T.

On the basis of the angle indicated in the lower graph calculated from the angular velocity indicated in the upper graph, the control unit 150 calculates an index indicating magnitude of blurring of each of the plurality of images, and selects an image with the smallest index as a reference image. For example, an index of magnitude of blurring in the first image calculated using the above-described Mathematical Formula (1) on the basis of the angle in the lower graph is $25 \times 10^{-6}$. Note that, in FIG. 5, the graph indicating the angular velocity in the y axis is omitted. Thus, the index indicating magnitude of blurring is calculated without considering the rotational component about the y axis.

Indices indicating magnitude of blurring in the second to fifth images calculated in a similar manner are $4 \times 10^{-6}$, $1 \times 10^{-6}$, $2 \times 10^{-6}$, and $3 \times 10^{-6}$, respectively. Among the calculation results, the index indicating magnitude of blurring in the third image is the smallest. Thus, the control unit 150 selects the third image as a reference image.

In this way, the control unit 150 selects an image with the smallest index indicating magnitude of blurring as a reference image, and the remaining images are superimposed on the image with small blurring. Therefore, the control unit 150 can generate an image in which blurring is further reduced than an image generated in the case of using the first image as a reference image without considering magnitude of blurring and superimposing the remaining images thereon.

After selecting the reference image, the control unit 150 superimposes the remaining images on the reference image in ascending order of indices, to combine the images. For example, on the basis of the angular velocity indicated in the lower graph, the control unit 150 superimposes each image on the reference image in the order of the fourth image (index=$2 \times 10^{-6}$), the fifth image (index=$3 \times 10^{-6}$), the third image (index=$4 \times 10^{-6}$), and the first images (index=$25 \times 10^{-6}$). At this time, the control unit 150 superimposes each image on the reference image while performing alignment by MFNR.

In this way, since the control unit 150 superimposes the remaining images on the reference image in ascending order of indices indicating magnitude of blurring, each of the remaining images is sequentially superimposed on the image with smaller blurring. Therefore, the control unit 150 can generate an image in which blurring is further reduced than an image generated in a case of superimposing the remaining images in the image capturing order without considering magnitude of blurring.

Note that, in the above-described example, an example in which magnitude of blurring is indicated on the basis of the angular velocity measured by the gyro sensor has been described. However, the control unit 150 may estimate the index indicating magnitude of blurring on the basis of acceleration measured by the acceleration sensor. For example, the control unit 150 estimates the index indicating magnitude of blurring on the basis of a translation component obtained from the acceleration measured by the acceleration sensor when the position of the mobile terminal 10 moves. In addition, while the image capturing unit 130 is performing image capturing on the basis of an image capturing instruction, the control unit 150 may estimate the index indicating magnitude of blurring on the basis of the translation component obtained from the acceleration measured by the acceleration sensor when the position of the mobile terminal 10 moves.

As described above, the index indicating magnitude of blurring according to the present embodiment is estimated on the basis of at least one of the above-described angular velocity or acceleration. For example, in a case where the index indicating magnitude of blurring is estimated on the basis of both the angular velocity and the acceleration, accuracy of the estimation is further improved. However, in a case where a distance from the image capturing unit 130 to a subject is long, since a rotational component is more dominant than a translation component, the control unit 150 may estimate the index indicating magnitude of blurring using the angular velocity only, without using the acceleration.

In addition, the control unit 150 also controls processing related to storage of an image. Specifically, the control unit 150 outputs an image received from the image capturing unit 130 to the storage unit 160, and causes the storage unit 160 to store the image. In addition, the control unit 150 may output an image on which noise reduction processing has been performed to the storage unit 160, and causes the storage unit 160 to store the image.

In addition, the control unit 150 controls processing of displaying an image on the display unit 170. Specifically, the control unit 150 causes the display unit 170 to display, as a thumbnail, an image obtained by performing noise reduction processing on an image received from the image capturing unit 130. Note that a display position and the size of the thumbnail are not particularly limited. The thumbnail may be displayed in any size at any position.

Note that, in some cases, the noise reduction processing takes time, and it may take time to display the thumbnail. To avoid this, the control unit 150 may cause the display unit 170 to display, as a thumbnail, the image received from the image capturing unit 130 as it is. Then, after completion of the processing of superimposing the images, the image before the processing may be replaced with the image after the processing, so that the image after the processing is displayed on the display unit 170 as a thumbnail.

Note that the processing performed by the control unit 150 on the image captured by the image capturing unit 130 may be performed on an image captured by the inner camera included in the mobile terminal 10.

(5) Storage Unit 160

The storage unit 160 has a function of storing information regarding the mobile terminal 10. For example, the storage unit 160 stores an image captured by the image capturing unit 130. Specifically, the storage unit 160 receives, from the control unit 150, the image captured by the image capturing unit 130, and stores the image. In addition, the storage unit 160 may store an image obtained by performing MFNR processing by the control unit 150.

Note that the information stored in the storage unit 160 is not limited to the above-described image. For example, the storage unit 160 may store data other than images output in the processing performed by the control unit 150, programs such as various applications, data, and the like.

(6) Display Unit 170

The display unit 170 has a function for displaying an image. For example, the display unit 170 displays an image obtained by performing MFNR processing. Specifically, the display unit 170 displays the image on which the control unit 150 has performed the MFNR processing.

In addition, the display unit 170 may display an image captured by the image capturing unit 130. Specifically, the display unit 170 receives, from the control unit 150, the image captured by the image capturing unit 130, and displays the image as a thumbnail. Note that the display unit 170 may display, as a thumbnail, an image on which the control unit 150 has performed camera shake reduction processing.

The function as the display unit 170 is implemented by, for example, a cathode ray tube (CRT) display device, a liquid crystal display (LCD) device, or an organic light emitting diode (OLED) device.

Note that, in FIG. 2, the mobile terminal 10 has a configuration in which the display unit 170 and the operation unit 120 are separated. However, a configuration in which the display unit 170 and the operation unit 120 are integrated may be adopted. In that case, by use of a touch panel as the display unit 170, the display unit 170 may have a function as the operation unit 120. By use of a touch panel as the display unit 170, a user can input an image capturing instruction by touching (pressing) a software switch displayed on the display unit 170.

The touch panel detects a touched position when the surface (detection surface) of a display panel is touched by an object such as a finger or a pen. For example, the touch panel detects that an area where the display panel is displaying an image or the like is touched by a finger or a pen. Note that the touch panel may be laminated on the display panel, or may be configured integrally with the display panel. The touch panel may be an electrostatic capacitance type touch panel, for example. In this case, it is detected from changes in electrostatic capacitance that the surface of the display panel is touched by a finger or the like.

Data of a touched position detected by the touch panel is output to the control unit 150. The control unit 150 executes an active application on the basis of the received touched position. The touched position is indicated by a coordinate position expressed by, for example, two orthogonal axes, which is an X axis (horizontal axis) and a Y axis (vertical axis). The number of coordinate positions detected by the touch panel is not limited to one. In a case where a plurality of points is touched at the same time, the control unit 150 performs control based on the detected plurality of points. In addition, in a case where a wide range of the touch panel is touched at the same time, the control unit 150 detects the entire touched range.

The configuration example of the mobile terminal 10 according to the embodiment of the present disclosure has been described above with reference to FIGS. 2 to 5. Subsequently, an operation example of the information processing apparatus according to the embodiment of the present disclosure will be described.

2.2. Operation Example

Figure 6:
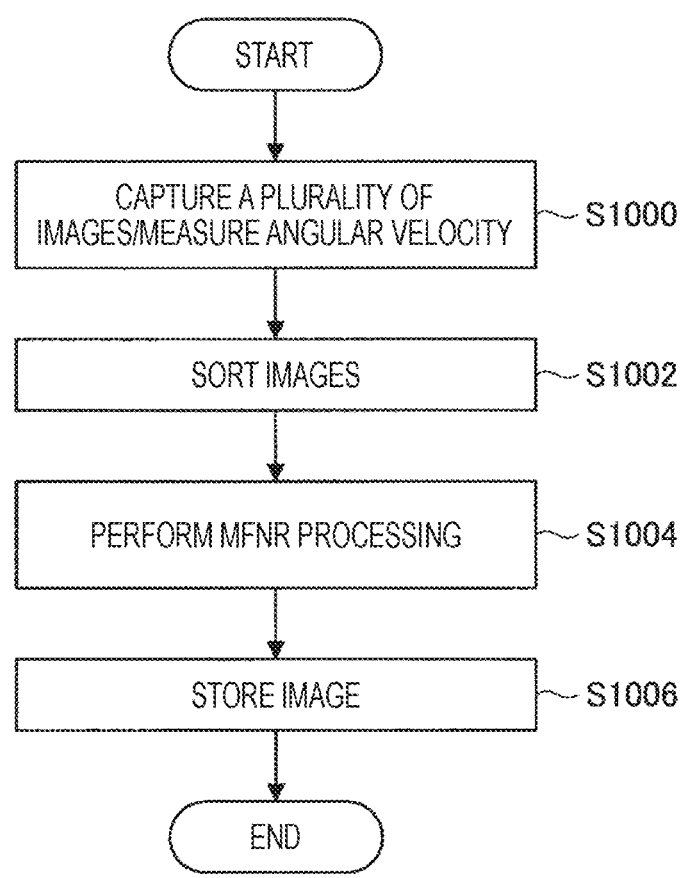
FIG. 6 is a flowchart of an operation example of the mobile terminal according to the embodiment.

Hereinafter, an operation example of the mobile terminal 10 according to the embodiment of the present disclosure will be described with reference to FIG. 6. FIG. 6 is a flowchart of the operation example of the mobile terminal according to the embodiment of the present disclosure.

As illustrated in FIG. 6, first, the image capturing unit 130 of the mobile terminal 10 captures a plurality of images, triggered by an image capturing instruction input by a user operation (step S1000). In addition, the sensor unit 140 of the mobile terminal 10 measures, by the gyro sensor, an angular velocity generated by movement of the mobile terminal 10 while the images are captured by the image capturing unit 130 (step S1000).

On the basis of the angular velocity measured by the gyro sensor, the control unit 150 of the mobile terminal 10 calculates an index indicating magnitude of camera shake in each of the plurality of images. Then, the control unit 150 selects, as a reference image, an image with the smallest index among the plurality of images, and sorts remaining images in ascending order of indices starting from the reference image (step S1002).

After sorting the images, the control unit 150 performs MFNR processing in which the remaining images are superimposed on the reference image in ascending order of indices (step S1004).

The control unit 150 outputs an image obtained by performing the MFNR processing to the storage unit 160 to cause the storage unit 160 to store the image, and the processing ends (step S1006).

The operation example of the information processing apparatus according to the embodiment of the present disclosure has been described above with reference to FIG. 6. Subsequently, experimental results according to the embodiment of the present disclosure will be described.

2.3. Experimental Results

Figure 7:
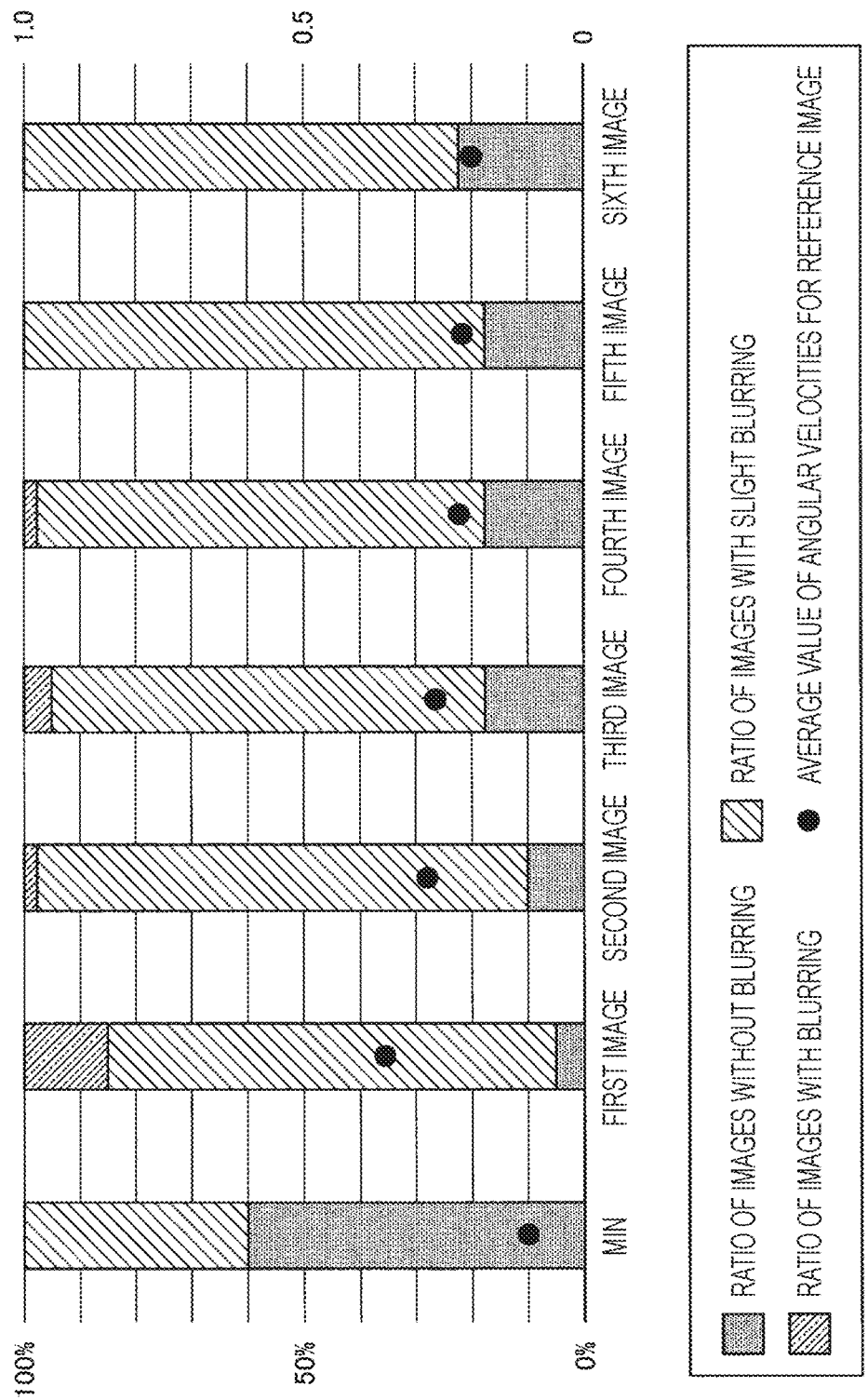
FIG. 7 is an explanatory diagram illustrating an effect of reducing the number of images with blurring in according to the embodiment.
Figure 8:
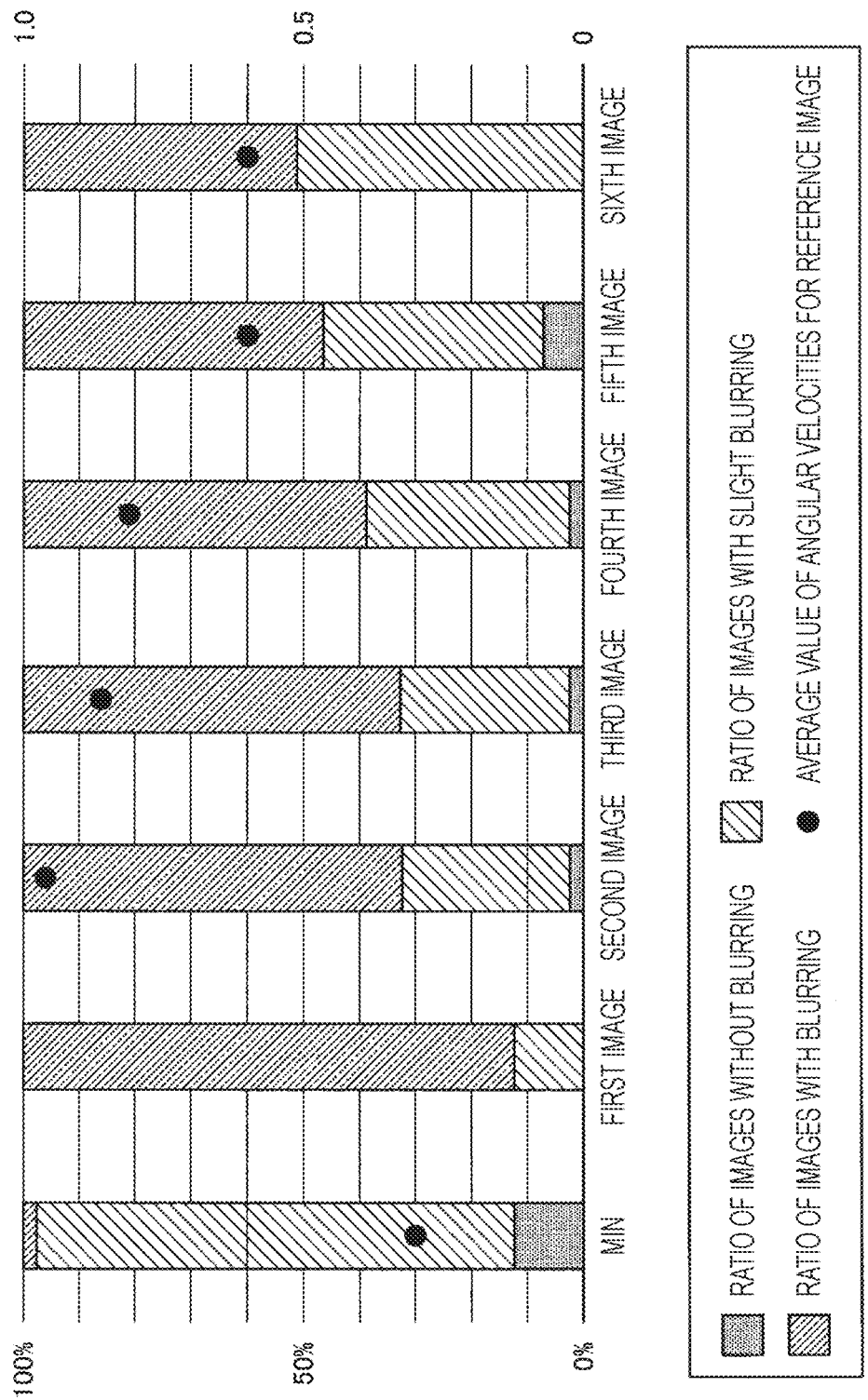
FIG. 8 is an explanatory diagram illustrating an effect of reducing the number of images with blurring according to the embodiment.

Hereinafter, experimental results according to the embodiment of the present disclosure will be described with reference to FIGS. 7 and 8. FIG. 7 is an explanatory diagram illustrating an effect of reducing the number of images with blurring when a shutter speed is ⅟60 s, according to the present embodiment. FIG. 8 is an explanatory diagram illustrating an effect of reducing the number of images with blurring when a shutter speed is ⅟15 s, according to the present embodiment.

The graph of FIG. 7 indicates ratios of types of images obtained by performing the MFNR processing when image capturing has been performed 50 times with the shutter speed set to ⅟60 s, in a state where camera shake is caused by a user holding the mobile terminal 10 laterally by hand. Note that there are three types of images: images without blurring, images with slight blurring, and images with blurring. These classifications were made visually by an experimenter. In addition, in the graph, a vertical axis on the left side indicates the ratios of the types of the images, and a vertical axis on the right side indicates average values of angular velocities for reference images. In addition, the horizontal axis indicates images selected as the reference images among the continuously captured images. For example, MIN indicates that an image with the smallest index indicating magnitude of blurring has been selected as the reference image. In addition, the first image indicates that an image captured first has been selected as the reference image. The second to sixth images indicate the similar meaning to the meaning indicated by the first sheet.

As illustrated in FIG. 7, it can be seen that a ratio of images without blurring is about 12 times larger in the case where the image with the smallest index indicating magnitude of blurring has been used as the reference image than in the case where the first image has been used as the reference image without considering blurring. In addition, it can be seen that a ratio of images without blurring is larger in the case where the image with the smallest index has been used as the reference image than in the case where any one of the second to sixth images has been used as the reference image without considering blurring, as with the case of using the first image. Note that, in any of the cases of MIN and the first to sixth images, since setting of ISO sensitivity is not changed, a noise amount is similar in any of the cases.

Therefore, by selecting, as the reference image, the image with the smallest index indicating magnitude of blurring, it is possible to capture an image with a similar amount of noise and a small amount of camera shake, as compared with the general method.

The graph of FIG. 8 indicates ratios of types of images obtained by performing the MFNR processing when image capturing has been performed 50 times by a user under the conditions similar to those in the graph of FIG. 7, except for the shutter speed.

As illustrated in FIG. 8, ratios of types of images in the case of MIN are close to ratios of types of images in the case of the first to sixth images indicated in the graph of FIG. 7. That is, in the case of MIN, even when the shutter speed is reduced from ⅟60 to ⅟15, a ratio of images with blurring is almost the same as that in the case where the general method is used with the shutter speed of ⅟60. In addition, since it becomes possible to lower the ISO sensitivity accordingly for image capturing, noise can be reduced.

Therefore, by selecting, as the reference image, the image with the smallest index indicating magnitude of blurring, it is possible to capture an image with a similar amount of camera shake and a small amount of noise, as compared with the general method.

The experimental results according to the embodiment of the present disclosure have been described above with reference to FIGS. 7 and 8.

The information processing apparatus according to the embodiment of the present disclosure has been described above with reference to FIGS. 2 to 8. Subsequently, modifications according to the embodiment of the present disclosure will be described.

3. Modifications

Hereinafter, modifications of the embodiment of the present disclosure will be described. Note that the modifications to be described below may be applied to the embodiment of the present disclosure alone or in combination. In addition, the modifications may be applied instead of or in addition to the configurations described in the embodiment of the present disclosure.

(1) First Modification

In the above-described embodiment, an example has been described in which the control unit 150 superimposes, on the reference image, all the remaining images other than the reference image. In a first modification, an example will be described in which the control unit 150 superimposes, on the reference image, an image with an index equal to or less than a predetermined threshold among the remaining images.

For example, the control unit 150 calculates an index indicating magnitude of blurring in each of a plurality of images by using the above-described Mathematical Formula (1), and before performing MFNR processing, determines whether or not the calculated index is smaller than a predetermined threshold set in advance. In a case where the index is smaller than the predetermined threshold, the control unit 150 uses, for the MFNR processing, an image corresponding to the index. In addition, in a case where the index is larger than the predetermined threshold, the control unit 150 does not use, for the MFNR processing, an image corresponding to the index.

As described above, by performing determination processing based on the index indicating magnitude of blurring, the control unit 150 can exclude, from images to be used for superimposition, the image with the index greater than the predetermined threshold, that is, an image in which magnitude of blurring is larger than predetermined magnitude. Therefore, since images having magnitude of blurring smaller than the predetermined magnitude are superimposed, the control unit 150 can generate an image in which blurring is further reduced than an image generated in a case where the determination processing is not performed.

(2) Second Modification

In the above-described embodiment, an example has been described in which the control unit 150 superimposes, on a reference image, the remaining images other than the reference image as they are. In the second modification, an example will be described in which the control unit 150 sets weight in accordance with the index, and after applying the weight to the index of each of a plurality of images, the remaining images are superimposed on the reference image.

For example, the control unit 150 calculates an index indicating magnitude of blurring in each of a plurality of images by using the above-described Mathematical Formula (1), and before performing MFNR processing, sets weight in accordance with the index. Specifically, the larger the index, the smaller the weight is set, and the smaller the index, the larger the weight is set. Then, the control unit 150 performs the MFNR processing after multiplying the weight by the corresponding index.

As described above, the control unit 150 sets smaller weight as the index is larger, so that the larger the magnitude of blurring, the smaller the weight in superimposition can be made. Thus, the control unit 150 can generate an image in which blurring is further reduced.

The modifications according to the embodiment of the present disclosure have been described above. Subsequently, a hardware configuration according to the embodiment of the present disclosure will be described.

4. Hardware Configuration

Figure 9:
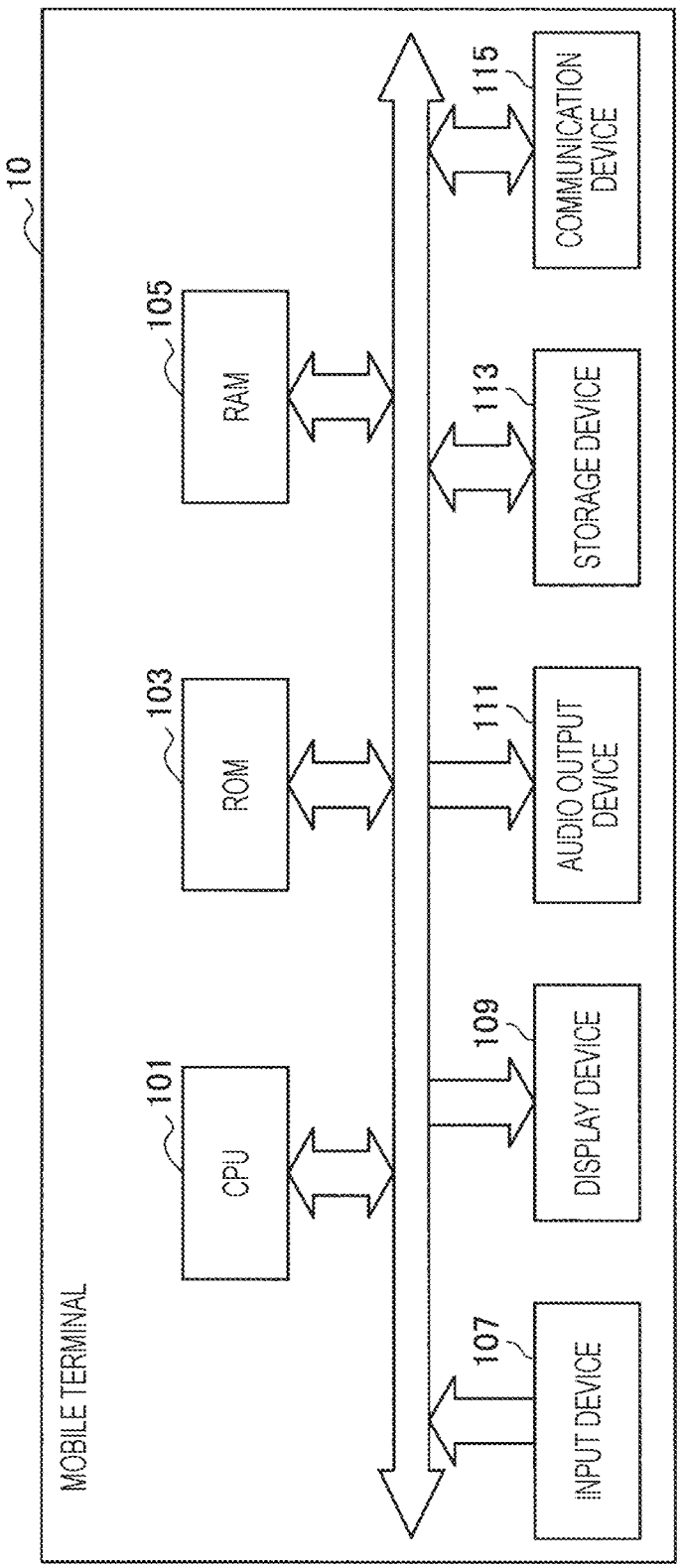
FIG. 9 is a block diagram illustrating a hardware configuration example of the mobile terminal according to the embodiment.

Lastly, a hardware configuration of the mobile terminal according to the present embodiment will be described with reference to FIG. 9. FIG. 9 is a block diagram illustrating an example of the hardware configuration of the mobile terminal according to the present embodiment. Information processing by the mobile terminal 10 according to the present embodiment is implemented by cooperation between software and hardware to be described below.

The mobile terminal 10 includes a central processing unit (CPU) 101, a read only memory (ROM) 103, and a random access memory (RAM) 105. In addition, the mobile terminal 10 includes an input device 107, a display device 109, an audio output device 111, a storage device 113, and a communication device 115.

The CPU 101 functions as an arithmetic processing device and a control device, and controls overall operations in the mobile terminal 10 in accordance with various programs. In addition, the CPU 101 may be a microprocessor. The ROM 103 stores the programs, operation parameters, and the like used by the CPU 101. The RAM 105 temporarily stores the programs used in execution of the CPU 101, parameters that appropriately change in the execution, and the like. These are mutually connected by a host bus including a CPU bus. The CPU 101, the ROM 103, and the RAM 105 can implement the functions of the control unit 150 described with reference to FIG. 1, for example.

The input device 107 includes input means for a user to input information, such as a touch panel, a button, a camera, a microphone, a sensor, a switch, and a lever, and an input control circuit that generates an input signal on the basis of user input and outputs the generated input signal to the CPU 101. The input device 107 can implement the functions of the operation unit 120, the image capturing unit 130, and the sensor unit 140, described with reference to FIG. 1, for example.

The display device 109 includes, for example, a display unit such as a cathode ray tube (CRT) display device, a liquid crystal display (LCD) device, a projector device, an organic light emitting diode (OLED) device, and a lamp. For example, the display device 109 can implement the function of the display unit 170 described with reference to FIG. 1, for example. In addition, the audio output device 111 includes an audio output device such as a speaker and a headphone.

The storage device 113 is a device for storing data. The storage device 113 may include a storage medium, a recording device that records data on the storage medium, a readout device that reads out data from the storage medium, and a deletion device that deletes data recorded on the storage medium. The storage device 113 includes, for example, a hard disk drive (HDD) or a solid storage drive (SSD), or a memory having equivalent functions. The storage device 113 drives storage to store programs executed by the CPU 101 and various data. The storage device 113 can implement the function of the storage unit 160 described with reference to FIG. 1, for example.

The communication device 115 is a communication interface including a communication device for connecting to a network, for example. Such a communication interface is, for example, a short-range wireless communication interface such as Bluetooth (registered trademark) or ZigBee (registered trademark), or a communication interface such as a wireless local area network (LAN), Wi-Fi, or a mobile communication network (LTE, 3G). In addition, the communication device 115 may be a wired communication device that performs wired communication.

The hardware configuration of the mobile terminal 10 has been described above with reference to FIG. 9.

5. Conclusion

As described above, the control unit included in the information processing apparatus according to the present disclosure selects a reference image from a plurality of images continuously captured, on the basis of information acquired by the inertial sensor when the plurality of images are captured. Then, the control unit performs processing of superimposing remaining images on the selected reference image while performing alignment with the reference image, to combine the images into one image.

With the information processing apparatus, by selecting, as a reference image, an image with the smallest index indicating magnitude of blurring, it is possible to capture an image with less blurring even when image capturing conditions are similar to those in MFNR processing in which the first image is used as a reference.

In addition, with the information processing apparatus, by selecting, as a reference image, an image with the smallest index indicating magnitude of blurring, it is possible to capture an image in which an amount of camera shake is similar to that in an image obtained by performing MFNR processing in which the first image is used as a reference, even when the image is captured with a slow shutter speed. Thus, with the information processing apparatus, ISO sensitivity can be reduced, and therefore it is possible to capture an image with a similar amount of blurring and a small amount of noise, as compared with an image obtained by performing MFNR processing in which the first image is used as a reference image.

As described above, it is possible to provide a new and improved information processing apparatus, information processing method, and program that are capable of further enhancing an effect of reducing blurring or noise in an image at the time of MFNR.

The preferred embodiments of the present disclosure have been described in detail above with reference to the accompanying drawings, but a technical scope of the present disclosure is not limited to such examples. It is obvious that a person having ordinary knowledge in the technical field of the present disclosure can conceive of various changes or modifications within the scope of the technical idea described in the claims, and as a matter of course, it is understood that the changes or the modifications also belongs to the technical scope of the present disclosure.

In addition, a series of processing performed by each device described in the present specification may be implemented using any one of software, hardware, and a combination of software and hardware. A program constituting software is stored in advance on a recording medium (non-transitory medium) provided inside or outside each device, for example. Then, each program is read into the RAM when a computer executes the program, and is executed by a processor such as a CPU, for example.

In addition, the processing described with reference to the flowchart in the present specification may not be executed in the illustrated order. Some processing steps may be performed in parallel. In addition, an additional processing step may be employed, or some processing steps may be omitted.

In addition, the effects described in the present specification are merely illustrative or exemplary and not limiting. That is, the technology according to the present disclosure can exhibit, in addition to or instead of the above-described effects, other effects that are apparent to those skilled in the art from the description of the present specification.

Note that the following configurations also belong to the technical scope of the present disclosure.

(1)

An information processing apparatus including a control unit that selects a reference image from a plurality of images continuously captured by an image capturing apparatus, on the basis of information of the image capturing apparatus acquired by an inertial sensor when each of the images is captured, and superimposes remaining images on the reference image while performing alignment with the reference image, to combine the images into one image.

(2)

The information processing apparatus according to (1), in which the control unit acquires, on the basis of the information, an index indicating magnitude of blurring in each of the plurality of images, and selects, as a reference image, an image with the smallest magnitude of blurring indicated by the index.

(3)

The information processing apparatus according to (2), in which the control unit superimposes the remaining images on the reference image in ascending order of indices, to combine the images.

(4)

The information processing apparatus according to (2) or (3), in which the control unit calculates the index on the basis of an angular velocity of the image capturing apparatus acquired a plurality of times by a gyro sensor during one exposure time when each of the plurality of images is captured.

(5)

The information processing apparatus according to (4), in which the control unit sets an axis in an image capturing direction of the image capturing apparatus as a roll axis, and uses at least one of angular velocities relative to a pitch axis or a yaw axis, the pitch axis and the yaw axis being orthogonal to the roll axis, to calculate the index.

(6)

The information processing apparatus according to (5), in which the control unit selects, in accordance with a type of an image capturing instruction from a user, which angular velocity to use among the angular velocities relative to the roll axis, the pitch axis, and the yaw axis.

(7)

The information processing apparatus according to (6), in which in a case where the control unit receives the image capturing instruction of the type in which the image capturing apparatus rotates about the yaw axis or the pitch axis as a rotation axis, the control unit calculates the index using, among the angular velocities, at least the angular velocities relative to the pitch axis and the yaw axis.

(8)

The information processing apparatus according to (6) or (7), in which in a case where the control unit receives the image capturing instruction of the type in which the image capturing apparatus rotates about the roll axis as a rotation axis, the control unit calculates the index using, among the angular velocities, at least the angular velocity relative to the roll axis.

(9)

The information processing apparatus according to any one of (2) to (8), in which the control unit superimposes, on the reference image, an image with the index equal to or less than a predetermined threshold among the remaining images.

(10)

The information processing apparatus according to any one of (2) to (9), in which the control unit sets weight in accordance with the index, and after applying the weight to each index of the plurality of images, superimposes the remaining images on the reference image.

(11)

An information processing method executed by a processor, the method including selecting a reference image from a plurality of images continuously captured by an image capturing apparatus, on the basis of information of the image capturing apparatus acquired by an inertial sensor when each of the images is captured, and superimposing remaining images on the reference image while performing alignment with the reference image, to combine the images into one image.

(12)

A program for causing a computer to function as a control unit that selects a reference image from a plurality of images continuously captured by an image capturing apparatus, on the basis of information of the image capturing apparatus acquired by an inertial sensor when each of the images is captured, and superimposes remaining images on the reference image while performing alignment with the reference image, to combine the images into one image.

REFERENCE SIGNS LIST

10 Mobile terminal
120 Operation unit
130 Image capturing unit
140 Sensor unit
150 Control unit
160 Storage unit
170 Display unit

The invention claimed is:

1. An information processing apparatus, comprising:
processing circuitry configured to
   acquire, based on information of an image capturing apparatus acquired by an inertial sensor in a case that each image of a plurality of images continuously captured by the image capturing apparatus, an index indicating a magnitude of blurring in each image of the plurality of images;
   select, as a reference image, an image from the plurality of images having a smallest amount of blurring indicated by the index; and
   superimpose, while performing alignment with the reference image, remaining images of the plurality of images on the reference image in an ascending order of blurring amount according to the index to combine the plurality of images into one image.

2. The information processing apparatus according to claim 1, wherein the processing circuitry is further configured to calculate the index based on an angular velocity of the image capturing apparatus acquired a plurality of times by a gyro sensor during one exposure time in a case that each of the plurality of images is captured.

3. The information processing apparatus according to claim 2, wherein the processing circuitry is further configured to
   set an axis in an image capturing direction of the image capturing apparatus as a roll axis, and
   use at least one of angular velocities relative to a pitch axis or a yaw axis, the pitch axis and the yaw axis being orthogonal to the roll axis, to calculate the index.

4. The information processing apparatus according to claim 3, wherein the processing circuitry is further configured to select, in accordance with a type of an image capturing instruction from a user, which angular velocity to use among the angular velocities relative to the roll axis, the pitch axis, and the yaw axis.

5. The information processing apparatus according to claim 4, wherein in a case that the processing circuitry receives the image capturing instruction of the type in which the image capturing apparatus rotates about the yaw axis or the pitch axis as a rotation axis, the processing circuitry calculates the index using, among the angular velocities, at least the angular velocities relative to the pitch axis and the yaw axis.

6. The information processing apparatus according to claim 4, wherein in a case that the processing circuitry receives the image capturing instruction of the type in which the image capturing apparatus rotates about the roll axis as a rotation axis, the processing circuitry calculates the index using, among the angular velocities, at least the angular velocity relative to the roll axis.

7. The information processing apparatus according to claim 1, wherein the processing circuitry superimposes, on the reference image, an image with the index equal to or less than a predetermined threshold among the remaining images.

8. The information processing apparatus according to claim 1, wherein the processing circuitry is further configured to
   set weight in accordance with the index, and
   after applying the weight to each index of the plurality of images, superimpose the remaining images on the reference image.

9. An information processing method, comprising:
   acquiring, by processing circuitry of an information processing apparatus based on information of an image capturing apparatus acquired by an inertial sensor in a case that each image of a plurality of images continuously captured by the image capturing apparatus, an index indicating a magnitude of blurring in each image of the plurality of images;
   selecting, as a reference image, an image from the plurality of images having a smallest amount of blurring indicating by the index; and
   superimposing, while performing alignment with the reference image, remaining images of the plurality of images on the reference image in an ascending order of blurring amount according to the index to combine the plurality of images into one image.

10. The information processing method according to claim 9, further comprising:
   calculating the index based on an angular velocity of the image capturing apparatus acquired a plurality of times by a gyro sensor during one exposure time in a case that each of the plurality of images is captured.

11. The information processing method according to claim 10, further comprising:
   setting an axis in an image capturing direction of the image capturing apparatus as a roll axis; and
   using at least one of angular velocities relative to a pitch axis or a yaw axis, the pitch axis and the yaw axis being orthogonal to the roll axis, to calculate the index.

12. The information processing method according to claim 11, further comprising:
   selecting, in accordance with a type of an image capturing instruction from a user, which angular velocity to use among the angular velocities relative to the roll axis, the pitch axis, and the yaw axis.

13. The information processing method according to claim 12, further comprising:
   in a case that the information processing apparatus receives the image capturing instruction of the type in which the image capturing apparatus rotates about the yaw axis or the pitch axis as a rotation axis, calculating the index using, among the angular velocities, at least the angular velocities relative to the pitch axis and the yaw axis.

14. The information processing method according to claim 12, further comprising:
   in a case that the information processing apparatus receives the image capturing instruction of the type in which the image capturing apparatus rotates about the roll axis as a rotation axis, calculating the index using, among the angular velocities, at least the angular velocity relative to the roll axis.

15. The information processing method according to claim 9, the superimposing includes superimposing, on the reference image, an image with the index equal to or less than a predetermined threshold among the remaining images.

16. The information processing method according to claim 9, further comprising:
    setting weight in accordance with the index; and
    after applying the weight to each index of the plurality of images, superimposing the remaining images on the reference image.

17. A non-transitory computer readable medium storing computer executable instructions which, when executed by a computer, cause the computer to:
    acquire, based on information of an image capturing apparatus acquired by an inertial sensor in a case that each image of a plurality of images continuously captured by the image capturing apparatus, an index indicating a magnitude of blurring in each image of the plurality of images;
    select, as a reference image, an image from the plurality of images having a smallest amount of blurring indicated by the index; and
    superimpose, while performing alignment with the reference image, remaining images of the plurality of images on the reference image in an ascending order of blurring amount according to the index to combine the plurality of images into one image.

18. The non-transitory computer readable medium according to claim 17, wherein the computer is further caused to calculate the index based on an angular velocity of the image capturing apparatus acquired a plurality of times by a gyro sensor during one exposure time in a case that each of the plurality of images is captured.

19. The non-transitory computer readable medium according to claim 18, wherein the computer is further caused to
    set an axis in an image capturing direction of the image capturing apparatus as a roll axis, and
    use at least one of angular velocities relative to a pitch axis or a yaw axis, the pitch axis and the yaw axis being orthogonal to the roll axis, to calculate the index.

20. The non-transitory computer readable medium according to claim 19, wherein the computer is further caused to select, in accordance with a type of an image capturing instruction from a user, which angular velocity to use among the angular velocities relative to the roll axis, the pitch axis, and the yaw axis.

* * * * *